United States Patent [19]

Merriman

[11] Patent Number: 5,993,190
[45] Date of Patent: Nov. 30, 1999

[54] INJECTION MOLDING SYSTEM WITH IMPROVED PRESSURE BUSHING

[75] Inventor: Randy Jay Merriman, Altoona, Wis.

[73] Assignee: Illinois Tool Works Inc., Glenview, Ill.

[21] Appl. No.: 09/028,379

[22] Filed: Feb. 24, 1998

[51] Int. Cl.$^6$ .................................................. B29C 45/17
[52] U.S. Cl. ............................................................ 425/567
[58] Field of Search ............................................ 425/567

[56] References Cited

U.S. PATENT DOCUMENTS

| | | |
|---|---|---|
| 4,285,660 | 8/1981 | Mueller . |
| 4,340,156 | 7/1982 | Mueller . |
| 4,580,037 | 4/1986 | Muller . |
| 4,609,341 | 9/1986 | Muller . |
| 4,631,389 | 12/1986 | Muller . |
| 4,682,944 | 7/1987 | Muller . |
| 4,689,473 | 8/1987 | Muller . |
| 4,692,595 | 9/1987 | Muller . |
| 5,051,563 | 9/1991 | Muller . |
| 5,150,125 | 9/1992 | Muller . |

OTHER PUBLICATIONS

Cincinnati Milacron, (Brochure) "RoboShot, All Electric Injection Molding Machines", 1997, pp. 1–30.

*Primary Examiner*—Tim Heitbrink

[57] ABSTRACT

A molding system including an injection molding machine, particularly an electric injection molding machine, with an extrusion nozzle coupled to a hot tip system by an improved pressure bushing. The pressure bushing has a passage therethrough with an inlet and an extrusion nozzle seating surface disposed thereabout on an inlet side of the pressure bushing. The pressure bushing passage includes an outlet coupled to the hot tip system. The pressure bushing passage has a relatively reduced diameter and a reduced axial dimension that eliminate or at least substantially reduce ejecta from the coupling between an extrusion nozzle of the molding machine and the pressure bushing without freeze-out.

12 Claims, 1 Drawing Sheet

INJECTION MOLDING SYSTEM WITH IMPROVED PRESSURE BUSHING

BACKGROUND OF THE INVENTION

The invention relates generally to injection molding systems, and more particularly to improved pressure bushings for coupling molten materials extrusion nozzles to hot tip systems and combinations thereof.

Hot tip systems are known and include generally one or more heated tips for supplying molten materials, usually molten plastics, to corresponding mold cavities. Exemplary hot tip systems include the HPS Single and Multi-Tip Nozzle Standard and Special Systems, Types 97, 98 and 99, available from Ewikon N.A. Inc., Elgin, Ill. The molten material is supplied to the hot tip system by an extrusion nozzle of an injection molding machine. More particularly, the hot tip system, including the mold, is mounted and clamped in the injection molding machine between fixed and movable platens thereof. The extrusion nozzle is coupled to the hot tip system by a pressure bushing, which is mounted or otherwise securely fastened to the hot tip system. In operation, the extrusion nozzle is advanced toward and biased into seated engagement with the pressure bushing as molten material is supplied therefrom under pressure to the hot tip system. The force exerted by the extrusion nozzle on the pressure bushing varies depending on the type and rated clamping tonnage of the injection molding machine. The pressure at which the molten material is supplied from the extrusion nozzle to the hot runner system depends on the injection molding machine and hot tip system configurations.

In the past, injection molding machines were operated hydraulically, including operation of the movable platen, advancement and retraction of the extrusion nozzle, and extrusion of molten material therefrom. More recently, the hydraulic injection molding machines are being replaced in many applications by electric injection molding machines, which have several advantages over the hydraulic machines. Electric injection molding machines have, for example, substantially reduced power consumption and other operational cost savings some of which result from the elimination of hydraulic components. Electric machines are also not susceptible to drift, which plagues hydraulic machines, and provide generally more precise control over fluid pressure regulation and other systems operations, thereby providing more consistent molding performance and improved productivity.

Most hot tip systems were designed originally for use with hydraulic machines, and when used with electric machines have a tendency to eject molten material at high pressure from between the extrusion nozzle and the pressure bushing, a phenomenon referred to sometimes as blowback. Besides the obvious safety hazard blowback poses to personnel, it also adversely affects the supply of molten material to the hot tip system and the mold cavities by diverting the molten material supply and reducing supply pressure, thereby resulting in inconsistent molding performance.

Blowback of ejecta was not a significant problem with hydraulic injection molding machines because, in comparison to electric machines, hydraulic machines exert a relatively high force to bias the extrusion nozzle into seated engagement with the pressure bushing as molten material is supplied therefrom to the hot tip system.

The present invention is drawn toward advancements in the art of injection molding systems, and more particularly to novel pressure bushings for coupling injection molding machines to hot tip systems and combinations thereof.

The inventors of the present invention recognized that molten material ejecta may be eliminated or at least substantially reduced by appropriately modifying the pressure bushing by generally reducing the size of the molten material passage therethrough. The pressure bushing of the HPS Single and Multi-Tip Nozzle Standard and Special Systems discussed above, for example, have a passage diameter of approximately 0.475 inches and an axial dimension of approximately 0.125 inches. Other known pressure bushings have passage diameters of approximately 0.250 inches. These prior art pressure bushings, and more particularly the dimensions of the molten material passages therethrough, were designed for hydraulic molding machines, and when used with electric machines exhibit blowback of ejecta, which is undesirable.

Hot tip manufacturers and others have expressed mistaken concerns that reducing the size of the pressure bushing passage would unduly increase molten material supply pressure, and would give rise to an excessive pressure drop in the hot tip system, thereby adversely affecting molding performance. It was also believed, incorrectly, that molten material in the pressure bushing passage would have a tendency to form a hardened plug, a phenomenon referred to sometimes as freeze-off, especially upon cessation of the molten material supply and upon retraction of the extrusion nozzle away from the pressure bushing, and that the hardened plug would obstruct the supply of molten material to the tips of the hot tip system and possibly damage an internal heater tube thereof upon re-establishing the molten material supply. These concerns however proved erroneous.

It is an object of the invention to provide novel injection molding systems that overcome problems in the prior art, and novel injection molding systems that are economical to manufacture and operate.

It is also an object of the invention to provide novel injection molding systems that provide more consistent molding performance.

It is another object of the invention to provide novel injection molding systems that eliminate or at least substantially reduce blowback of ejecta from a coupling between injection molding machines, particularly electric injection molding machines, and hot tip systems.

It is a further object of the invention to provide novel injection molding systems with improved pressure bushings for coupling injection molding machines and hot tip systems, and improved pressure bushings that are retrofittable in existing injection molding systems.

A more particular object of the invention is to provide novel injection molding systems including an injection molding machine, especially an electric injection molding machine, coupleable to a hot tip system having an improved pressure bushing with a generally reduced molten material passage therethrough that eliminates or at least substantially reduces ejecta from the coupling between an extrusion nozzle of the molding machine and the pressure bushing without freeze-out.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
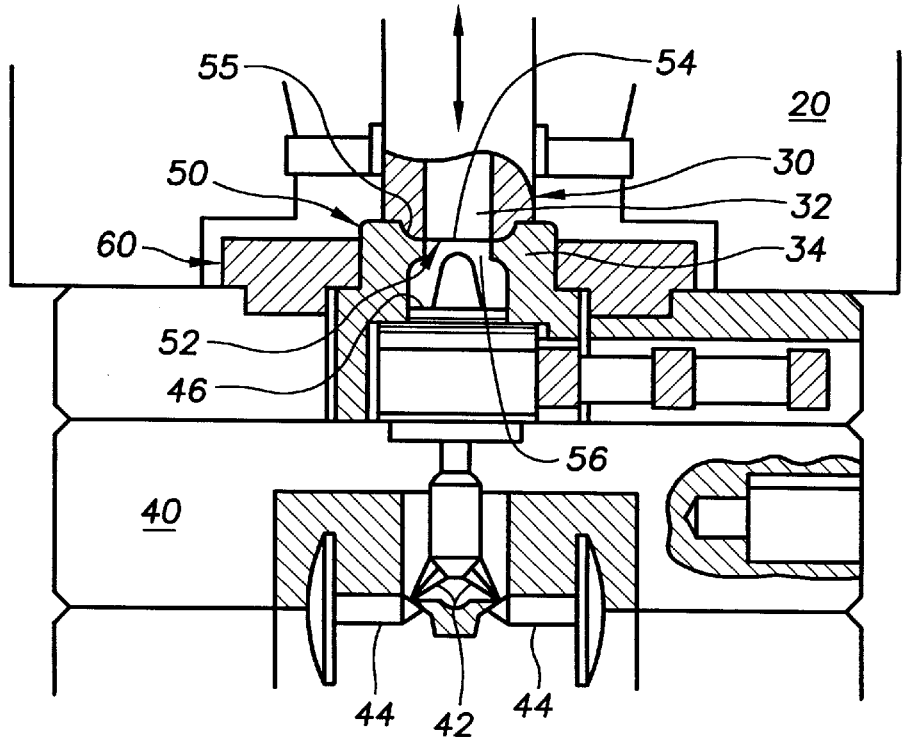
FIG. 1 is a partial sectional view of a hot tip system with a prior art pressure bushing coupled to an injection molding machine.

FIG. 1 illustrates an injection molding system comprising generally an injection molding machine 20, shown in part, having a molten material extrusion nozzle 30 for supplying molten material therefrom to a hot tip system 40 having one or more tips 42 for supplying molten material to corresponding mold cavities 44.

The injection molding machine 20 in the exemplary embodiment is preferably an electric injection molding machine, for example, one of the Roboshot™ all electric machines, Model Nos. 17R and 33R, available from Cincinnati Milacron™, Plastics Machinery Group, Batavia, Ohio. These exemplary electric injection molding machines supply molten material from an outlet 32 of the extrusion nozzle 30 to the hot tip system 40 at pressures up to approximately 34,000 psi depending on the injection molding machine and hot tip system configurations. The invention is applicable more generally to hot tip systems coupled to any electric or hydraulic injection molding machine supplying fluids at not more than approximately 34,000 psi.

FIG. 1 illustrates the hot tip system 40 including generally a molten material inlet 46, which is coupleable to the extrusion nozzle outlet 32 of the injection molding machine 20 as discussed further below, for supplying molten material to the one or more tips 42. The hot tip system 40 also includes an internal heater element controlled by a thermocouple as is known generally. The hot tip system 40 of the exemplary embodiment is a thermocouple controlled, multiple HPS Hot Tip system available from Ewikon N.A. Incorporated, Elgin, Ill., although the invention is more generally applicable to any of the HPS Single or Multi-Tip Nozzle Standard and Special Systems, Types 97, 98 and 99 available from Ewikon N.A. Inc. as discussed above, among other systems.

The system of FIG. 1 illustrates the hot tip system 40 including also a pressure bushing 50 fixedly mounted thereto, for example, by a locating ring 60 fastened to the hot tip system 40, whereby the prior art pressure bushing 50 is clamped between the locating ring 60 and the hot tip system 40. The prior art pressure bushing 50 includes generally an opening, or passage, 52 therethrough, having a relatively large diameter and a relatively long axial dimension as discussed in the Background of the Invention. The prior art pressure bushing 50 includes an inlet 54 on an inlet end thereof and a contoured seating surface 55 disposed about the inlet 54 for accommodating an end portion 34 of the extrusion nozzle 30. The prior art pressure bushing also includes an outlet 56 coupled to the hot tip system molten material inlet.

The extrusion nozzle end portion 34 is biasable into seated engagement with the contoured seating surface 55 disposed about the inlet 54 of the pressure bushing 50 with a force that depends on the type and rated tonnage of the particular injection molding machine 20 as discussed further below. The exemplary Roboshot™ all electric machines, Model Nos. 17R and 33R available from Cincinnati Milacron™, discussed above exert the extrusion nozzle 30 into seated engagement with the pressure bushing 50 with forces of approximately 0.77 tons and 0.88 tons, respectively. The pressure bushing of the present invention is more generally applicable for coupling hot tip systems to any hydraulic or electric injection molding machine that seats the extrusion nozzle 30 into engagement with the pressure bushing 50 with a force not less than approximately 0.77 tons.

Figure 2:
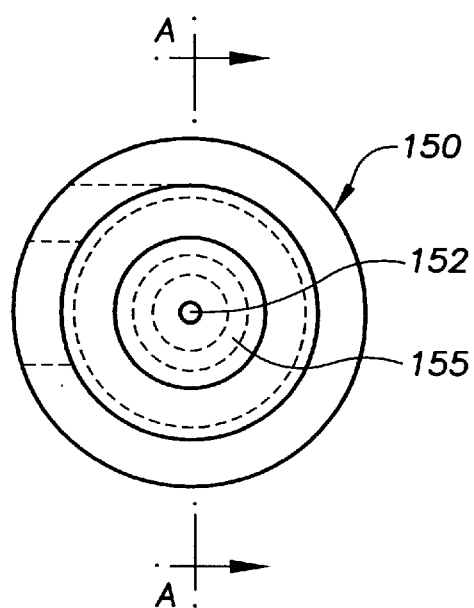
FIG. 2 is a top plan view of an improved pressure bushing according to an exemplary embodiment of the present invention.
Figure 3:
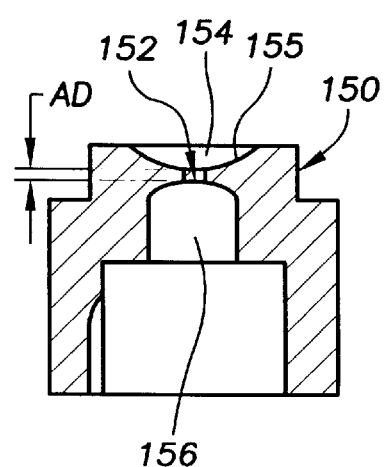
FIG. 3 is a sectional view along lines a—a of the improved pressure bushing of FIG. 1

FIGS. 2 and 3 illustrate a pressure bushing 150 according to the present invention having a molten material opening, or passage, 152 therethrough. The pressure bushing passage 152 includes an inlet 154 with a contoured seating surface 155 thereabout on an inlet side of the pressure bushing for accommodating the end portion 34 of the extrusion nozzle 30, as illustrated in FIG. 1. The pressure bushing passage 152 also includes an outlet 156 on an outlet side thereof, wherein the outlet is coupled to the hot tip system molten material inlet 46, as discussed above in connection with FIG. 1.

The diameter of the pressure bushing passage is dependent generally on the molten material supply pressure and the force with which the end portion 34 of the extrusion nozzle 30 is biased into seated engagement with the seating surface 155 of the pressure bushing. Generally, decreasing the molten material supply pressure and or increasing the force with which the extrusion nozzle is biased into engagement with the pressure bushing permits increasing the pressure bushing passage diameter without blowback of ejecta. Blowback will occur if the diameter of the pressure bushing passage is too great. Freeze-off of the molten material becomes a more likely possibility if the diameter of the pressure bushing passage is too narrow. In most applications, it is generally desirable to maximize the diameter of the pressure bushing passage, without permitting blowback, to increase the molten material supply rate to the hot tip system, thereby lessening the likelihood of freeze-off and increasing productivity.

In one application, the extrusion nozzle 30 supplies molten material at a pressure not exceeding approximately 34,000 psi and the end portion 34 of the extrusion nozzle is biased into seated engagement with the pressure bushing seating surface 155 with a force not less than approximately 0.77 tons, which is typical of the exemplary 17 ton Roboshot™ electric molding machine, Model No. 17R, discussed above. For this application, the diameter of the pressure bushing passage 152 is in a range between approximately 0.125 inches and approximately 0.196 inches, and in a preferred embodiment the diameter of the passage is approximately 0.196 inches.

In another application, the extrusion nozzle 30 supplies molten material at a pressure not exceeding approximately 34,000 psi and the end portion 34 of the extrusion nozzle 30 is biased into seated engagement with the pressure bushing seating surface 155 with a force not less than approximately 0.88 tons, which is typical of the exemplary 33 ton Roboshot™ electric molding machine, Model No. 33R, discussed above. For this alternative application, the diameter of the pressure bushing passage 152 is also in a range between approximately 0.125 inches and approximately 0.196 inches, with a preferred passage diameter of approximately 0.196 inches.

FIG. 3 illustrates the passage 152 of the pressure bushing 150 having an axial dimension AD. Generally, reducing the axial dimension of the passage 152 decreases the likelihood of freeze-off, particularly for the relatively narrow pressure bushing passage diameter range of the present invention. The structural integrity of the pressure bushing may be compromised however if the axial dimension AD of the passage is reduced without restraint, resulting in failure and possibly damage to the pressure bushing. The axial dimension of the pressure bushing passage also depends on the radius of the extrusion nozzle end portion 34.

In an exemplary embodiment, the axial dimension of the passage 152 is in a range between approximately 0.032 inches and approximately 0.100 inches. A pressure bushing passage having this exemplary axial dimension preferably accommodates an extrusion nozzle end portion 34 having a radius of approximately 0.75 inches. In a preferred embodiment, the end portion of the extrusion nozzle has a radius of approximately 0.75 inches, and the passage of the pressure bushing has an axial dimension of approximately 0.100 inches.

These exemplary pressure bushing axial dimensions are used preferably with a pressure bushing having a diameter in a range between approximately 0.125 inches and approximately 0.196 inches, wherein the injection molding machine supplies fluid at not more than approximately 34,000 psi and the extrusion nozzle 30 is seated into engagement with the pressure bushing 50 with a force not less than approximately 0.77 tons as discussed above.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. An injection molding system comprising:
    an injection molding machine having a material extrusion nozzle with an end portion for supplying molten material therefrom at a pressure not exceeding approximately 34,000 psi;
    a hot tip system having a molten material inlet;
    a pressure bushing coupled to the hot tip system, the pressure bushing having a molten material passage therethrough, the passage having an inlet on an inlet side of the pressure bushing, the passage having an outlet coupled to the hot tip system molten material inlet,
    a diameter of the pressure bushing passage in a range between approximately 0.125 inches and approximately 0.196 inches,
    the end portion of the extrusion nozzle is biasable into seated engagement with the inlet side of the pressure bushing passage with a force not less than approximately 0.77 tons,
    whereby ejecta is substantially eliminated when the end portion of the extrusion nozzle is biased into seated engagement with the pressure bushing.
2. The system of claim 1, wherein the end portion of the extrusion nozzle has a radius of approximately 0.75 inches, and the passage of the pressure bushing has an axial dimension in a range between approximately 0.032 inches and approximately 0.100 inches.
3. The system of claim 1, wherein the injection molding machine is an electric injection molding machine.
4. The system of claim 1, wherein the injection molding machine is a 17 ton electric injection molding machine, the end portion of the extrusion nozzle is biasable into engagement with the pressure bushing with a force of approximately 0.77 tons.
5. The system of claim 4, wherein the end portion of the extrusion nozzle has a radius of approximately 0.75 inches, the pressure bushing has a seating surface disposed about the passage inlet, and the passage of the pressure bushing has an axial dimension in a range between approximately 0.032 inches and approximately 0.100 inches.
6. The system of claim 4, wherein the passage of the pressure bushing has a diameter of approximately 0.196 inches.
7. The system of claim 1, wherein the injection molding machine is a 33 ton electric injection molding machine, the end portion of the extrusion nozzle is biasable into engagement with the pressure bushing with a force of approximately 0.88 tons.
8. The system of claim 7, wherein the end portion of the extrusion nozzle has a radius of approximately 0.75 inches, the pressure bushing has a seating surface disposed about the passage inlet, and the passage of the pressure bushing has an axial dimension in a range between approximately 0.032 inches and approximately 0.100 inches.
9. The system of claim 7, wherein the passage of the pressure bushing has a diameter of approximately 0.196 inches.
10. A pressure bushing for coupling an extrusion nozzle of an injection molding machine and a hot tip system, the extrusion nozzle supplying molten material to the hot tip system at a pressure not exceeding approximately 34,000 psi, the pressure bushing comprising:
    a molten material passage disposed through the pressure bushing,
    the passage having an inlet on an inlet side of the pressure bushing, the extrusion nozzle biasable into seated engagement with the pressure bushing on the inlet side with a force not less than approximately 0.77 tons;
    the passage having an outlet coupleable to the hot tip system; and
    a diameter of the pressure bushing in a range between approximately 0.125 inches and approximately 0.196 inches.
11. The pressure bushing of claim 10, wherein the end portion of the extrusion nozzle has a radius of approximately 0.75 inches, the pressure bushing has a seating surface disposed about the passage inlet, and the passage of the pressure bushing has an axial dimension in a range between approximately 0.032 inches and approximately 0.100 inches.
12. The pressure bushing of claim 10, wherein the passage of the pressure bushing has a diameter of approximately 0.196 inches.

* * * * *